Sept. 17, 1929.  E. J. DOWNING ET AL  1,728,337
BUSHING HOLDER FOR DRILL STEEL GUIDES
Filed Jan. 13, 1927
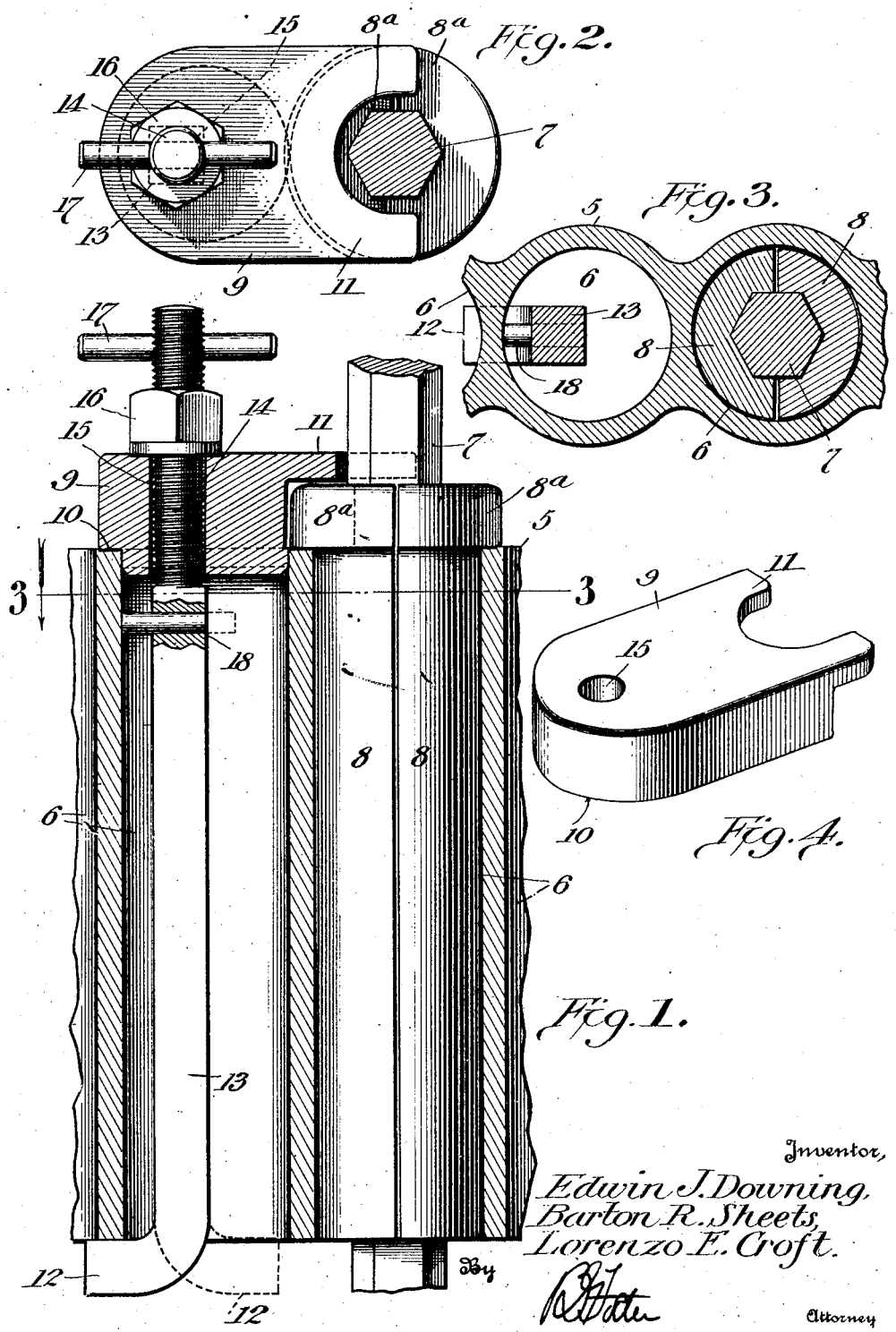
Inventor,
Edwin J. Downing,
Barton R. Sheets,
Lorenzo E. Croft.

Patented Sept. 17, 1929

1,728,337

UNITED STATES PATENT OFFICE

EDWIN J. DOWNING, BARTON R. SHEETS, AND LORENZO E. CROFT, OF DENVER, COLORADO, ASSIGNORS, BY MESNE ASSIGNMENTS, TO THE GARDNER-DENVER COMPANY, OF QUINCY, ILLINOIS, A CORPORATION OF DELAWARE

BUSHING HOLDER FOR DRILL-STEEL GUIDES

Application filed January 13, 1927. Serial No. 160,959.

The present invention relates to guides for rock drills of the type shown in the application of Richard Griffith, Serial No. 146,519, filed on November 11, 1926. In that structure a body is employed having a guideway for the drill and a detachable bushing is placed in the guideway. In practice, it is found that there is a tendency of these bushings to creep up out of the guideway due to the rapid reciprocation and vibration of the drill steel.

The object is to provide means that will effectively hold the bushings in place, said means being adjustable from guide to guide as the bushing and drill steel is shifted.

In the accompanying drawings:

Figure 1 is a vertical sectional view through a portion of the guide, showing the bushing and the retaining means for said bushing.

Figure 2 is a top plan view of the same.

Figure 3 is a sectional view of the line 3—3 of Figure 1,

Figure 4 is a perspective view of the retaining yoke.

A portion of the body of the guide is shown at 5, and said body is provided with a series of vertical guide openings, indicated at 6. A portion of a drill steel 7 is illustrated as passing through one of the guide openings and is surrounded by a bushing 8 that is detachably fitted in the guideway. This bushing is composed of sections having at their upper ends flanges 8ª that rest upon the top of the body 5. As above stated, this bushing, if otherwise free, has a tendency to creep upwardly in the guideway when the drill steel 7 is being hammered upon.

To overcome this tendency, a head 9 is employed that is adapted to fit in the adjacent guideway 6, being provided with a shoulder 10 that rests on the top of the body. This head is provided with an offset yoke 11 that overlies the upper ends of the sections of the bushing, the arms of the yoke being long enough to extend over the joint between the sections for the purpose of holding this head in place. A hook 12 is employed having a shank 13 that extends through the adjacent guideway and has an upper threaded end portion 14 rotatably engaged in an opening 15 in the head. The opening is preferably disposed eccentrically to the head, so that the shank will be arranged eccentrically within the guideway 6. A clamping nut 16 is screwed on the threaded portion and is adapted to bear upon the head 9. The upper end of the shank is provided with a cross pin 17 and the shank below the threaded portion preferably has a holding pin 18 fixed therein, said holding pin bearing against the wall of the guideway 6.

It will be evident that when a steel has been passed through a guideway and the guide bushing placed in position, the head 9 can be inserted in the next guideway with the yoke overlying the bushing, the hook being thrown to the position shown in dotted lines in Figure 1. The hook is then rotated by means of the cross pin 17 until it is engaged against the underside of the body and the nut 16 is then tightened, thereby clamping the head in place and holding the bushing against moving upwardly. Obviously the device can be easily removed and placed in the next guide opening when the drill steel and bushing are moved.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

What we claim is:

1. In guiding means for drill steels and the like, the combination with a body having a plurality of guide openings, of a tool-encircling bushing that detachably fits in the openings, and means engaged in an adjacent opening for securing the bushing in place.

2. In guiding means for drill steels and the like, the combination with a body having a plurality of guide openings, of a tool encircling bushing that detachably fits in the openings, and means that detachably engages in an adjacent opening and detachably engages the bushing to hold it in its opening.

3. In guiding means for drill steels and the like, the combination with a body having a plurality of guide openings, of a tool-encircling bushing that detachably fits in the openings, a cap yoke that detachably overlies the bushing, and means that detachably engages in an adjacent guide opening for securing the cap yoke to the body.

4. In guiding means for drill steels and the like, the combination with a body having a plurality of guide openings, of a tool-encircling bushing that detachably fits in the openings, a cap yoke that detachably overlies the bushing and has a head that detachably engages in an adjacent guide opening, and means for securing the head in said opening.

5. In guiding means for drill steels and the like, the combination with a body having a plurality of guide openings, of a tool-encircling bushing that detachably fits in the openings, a cap yoke that detachably overlies the bushing and has a head that detachably engages in an adjacent guide opening, and a retaining hook having a shank slidably and rotatably mounted in the head at one side of the axis of the guide opening, said hook being adapted to pass through the guide opening and engage the underside of the body.

In testimony whereof, we affix our signatures.

EDWIN J. DOWNING.
BARTON R. SHEETS.
LORENZO E. CROFT.